United States Patent [19]
Schaaf

[11] Patent Number: 5,744,185
[45] Date of Patent: Apr. 28, 1998

[54] PROCESS AND DEVICE FOR EXTRUDING AND COATING FOODSTUFFS

[75] Inventor: Heinz Josef Schaaf, Bad Camberg, Germany

[73] Assignee: Shaaf Technologie GmbH, Bad Camberg, Germany

[21] Appl. No.: 582,985
[22] PCT Filed: Jul. 20, 1994
[86] PCT No.: PCT/EP94/02401
  § 371 Date: Jan. 2, 1996
  § 102(e) Date: Jan. 2, 1996
[87] PCT Pub. No.: WO95/03703
  PCT Pub. Date: Feb. 9, 1995

[30] Foreign Application Priority Data

Aug. 3, 1993 [DE] Germany .......................... 43 26 047.0

[51] Int. Cl.⁶ .................. A21C 11/00; A23P 1/00
[52] U.S. Cl. ................ 426/516; 118/15; 425/90; 425/106; 426/302

[58] Field of Search ..................... 426/516, 302; 425/90, 104, 106; 264/132; 118/15, 16

[56] References Cited

U.S. PATENT DOCUMENTS 4,309,450  1/1982  Seibert ..................... 426/302

Primary Examiner—George Yeung
Attorney, Agent, or Firm—George W. Dishong

[57] ABSTRACT

A process is disclosed for extruding and coating foodstuffs, in which the foodstuff is extruded by means of an extruder device and, after the extrusion, is cut off by means of a cutting device (4, 5), the material (11), after leaving the extrusion die (2), being sprayed with at least one additive before it is cut off; furthermore, a device for carrying out the process is disclosed, which has an extruder screw for feeding the material (11) to be extruded, which is extruded through an extrusion die (2) and, after extrusion, is cut off by means of a cutting device (4, 5), at least one additive being sprayed onto the extruded material (1i) by means of at least one spray device (7) before the said extruded material (11) is cut off.

16 Claims, 2 Drawing Sheets

PROCESS AND DEVICE FOR EXTRUDING AND COATING FOODSTUFFS

FIELD OF THE INVENTION

The invention relates to a device for extruding foodstuffs, in which the foodstuff can be coated with additives such as colorants or the like. The device has an extruder screw for feeding the material to be extruded which is extruded through a die and is subsequently cut off by means of a cutting device.

BACKGROUND OF THE INVENTION

Extruded foodstuffs which emerge from the extrusion die as a stick with a specific contour are widespread. After it emerges from the die, the extrudate is cut off to the desired length by means of a cutting device and is subsequently packaged and put on the market, for example as a snack. Such a device for extruding foodstuffs is known, for example, from U.S. Pat. No. 4,240,779.

If the foodstuffs consisting of expanding doughs, which are often used for producing so-called snacks, are extruded by means of the extrusion machine, the pressure difference at the die, which is caused by the heating of the dough and the water vapour incorporated in the dough, causes a strong expansion of the cut-off extrudate strip.

The snacks or extrudate strips may be coated with additives to affect their taste or to make their appearance more attractive by the application of colour.

Various processes are known for coating the extrudates, for example the extrudates can be dipped in liquids or be processed with rolls which apply the corresponding additives. In this case, an extremely wide variety of patterned rolls may be used for colour application, which apply various patterns to the snack. In the process, however, corresponding patterned rolls have to be produced for the desired coating, which naturally cannot be used for other patterns or designs. In addition, this type of coating requires a complicated additional operation.

Of course, it is also possible to add additives such as colorants to the material to be extruded, so that extrudates with an extremely wide variety of colours can be produced. In this case the colorants can also be added in the region of the extrusion die, as a result of which colour strips and marbling effects are produced. A selective and only localized coating of the snacks, for example to produce an animal's eye, is not possible with this process.

SUMMARY OF THE INVENTION

The object of the invention is to provide a process for the extrusion and coating of foodstuffs with which extrudates can be coated with additives in a simple manner, furthermore a device for carrying out the process is to be provided.

The object is achieved by the features of Process Claim 1 and the features of Device Claim 11.

With the process according to the application, the extrudates can be coated with an additive, for example a colorant, during the extrusion in a simple manner without an additional production step.

This process for coating the extrudates can be combined with a process for influencing the shape of the extrudates to allow the extrudates to be shaped in a varied manner. In this process for influencing the shape, the extrudate is fissured at specific points before it is cut off. By means of this process, it is possible, for example, with the use of expanding doughs to produce animal figures with legs and ears which are very popular, particularly among children, since the expansion behaviour of the dough can be very greatly influenced by means of the applied fissures.

The spraying-on is preferably carried out not continuously but rather intermittently, an adaptation of the frequency to the extrusion rate or else to the cutting frequency of the cutting device providing the advantage that the additive is only sprayed onto the extruded parts at the desired points.

To control the spray device, a photoelectric cell may be used which registers the cutting-off of the extrudate by the cutting device. However, a timing generator may be used to obtain a synchronization of the spray device with the extrusion of the material.

The spraying-on of the additive is advantageously interrupted when the cutting device severs the extrudate, to prevent a soiling of the cutting device.

According to a further development of the invention, a plurality of additives, for example inks, are sprayed onto the extrudate during the extrusion operation. In this process, these substances may be sprayed on sequentially or simultaneously. Spray devices having print heads, such as are known in printing technology, have proved themselves for this purpose. These print heads may have a multiplicity of nozzles and permit the spraying-on of very complex designs. It has been found that the ink application with this technology produces a highly three-dimensional effect. Of course, only approved inks suitable for foodstuffs may be used for foodstuffs.

The print heads may operate according to the bubble-jet or piezoelectric process and may be provided with a device for cleaning blocked nozzles. The airless or magnetic process for spraying on the substances, which process operates without air supply, is also advantageous. The printing head should be easily exchangeable to obtain short stoppage times of the machine.

If print heads with a multiplicity of nozzles are used, an extremely wide variety of sprayed patterns can be generated by just an appropriate control of the print head. The spray device may be adjustable to adapt it to the product to be processed. According to a further development of the invention, the spray direction of the spray device is adjustable by means of a control device, as a result of which the spray device can be automatically adapted to various requirements and can even be adjusted during the operation of the device. With a device of this kind, the jet may even be pivoted during the spraying-on of the substances to obtain a specific design.

The invention is explained in greater detail below with reference to a preferred exemplary embodiment.

DESCRIPTION OF THE PREFERRED EMBODIMENT

Figure 1:
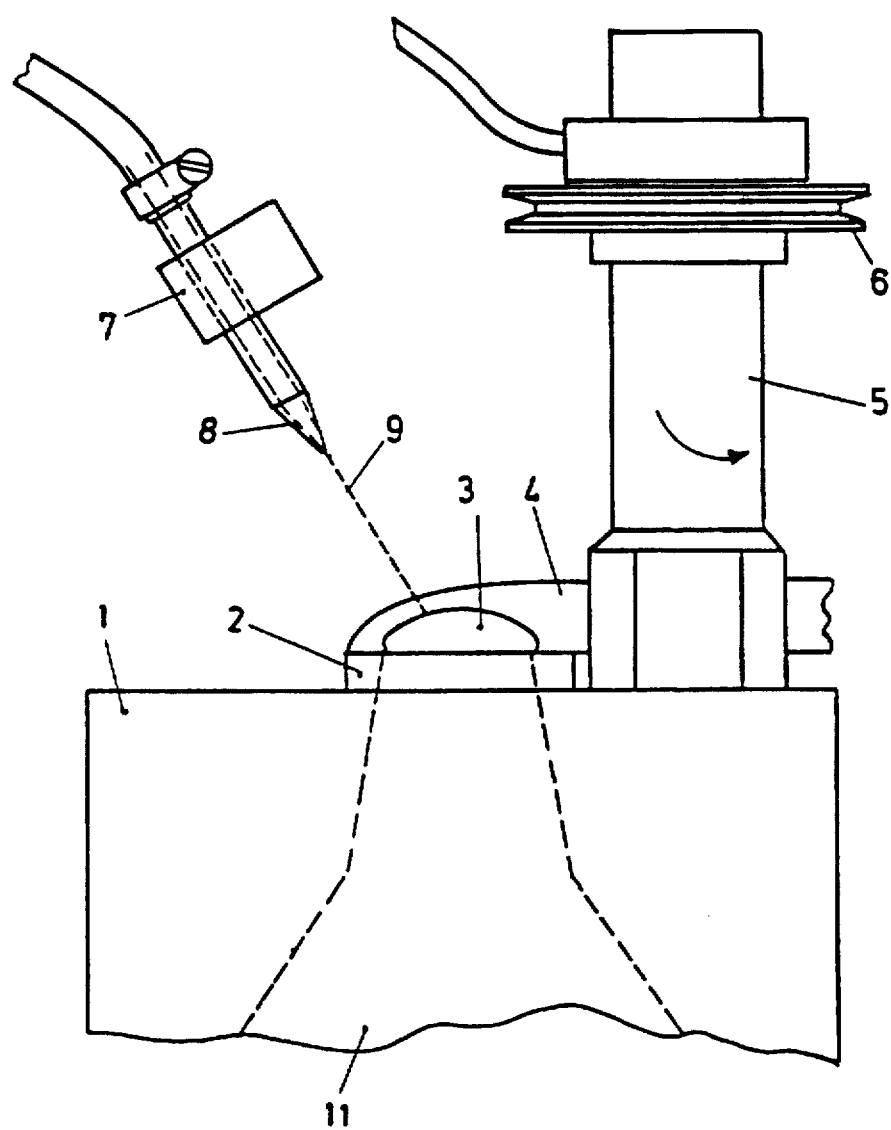
FIG. 1 shows the device according to the application from the side.

An extrusion die 2 for extruding material 11 is provided in a die head 1. Material 11 is forced by an extruder screw, not shown, through a channel in the die head 1 to the extrusion die 2. The material 11 passes through the die 2, which provides the extruded strand with the desired shape, and is cut into pieces of the desired length by a cutting device. In the exemplary embodiment illustrated, the cutting device is a knife-cutting device which has a knife 4 which is mounted on a rotatable knife shaft 5 which is driven by a belt, not illustrated, via a belt pulley 6. The knife 4 is designed and arranged such that it can sweep over the entire orifice of the extrusion die 2. In this arrangement, the knife 4 is arranged such that, while sweeping over the orifice of the extrusion die 2, it bears directly against the latter as a result of which a particularly neat cut is ensured. The length of the cut-off parts 3 of the extrudate can be set via the extrusion rate and the rate of rotation of the knife shaft 5.

As can be readily seen from FIG. 1, the part 3 of the extrudate is sprayed with an ink jet in the spray direction 9 by a spray device 7 with a print head 8. In FIG. 1, only one spray device 7 is illustrated diagrammatically. In this arrangement, the spraying of the part 3 is carried out before the part 3 is cut off from the extrudate. Since, in the position illustrated in FIG. 1, the part 3 is just being cut off, the spray operation is interrupted and the part 3 is already finish-sprayed.

Figure 2:
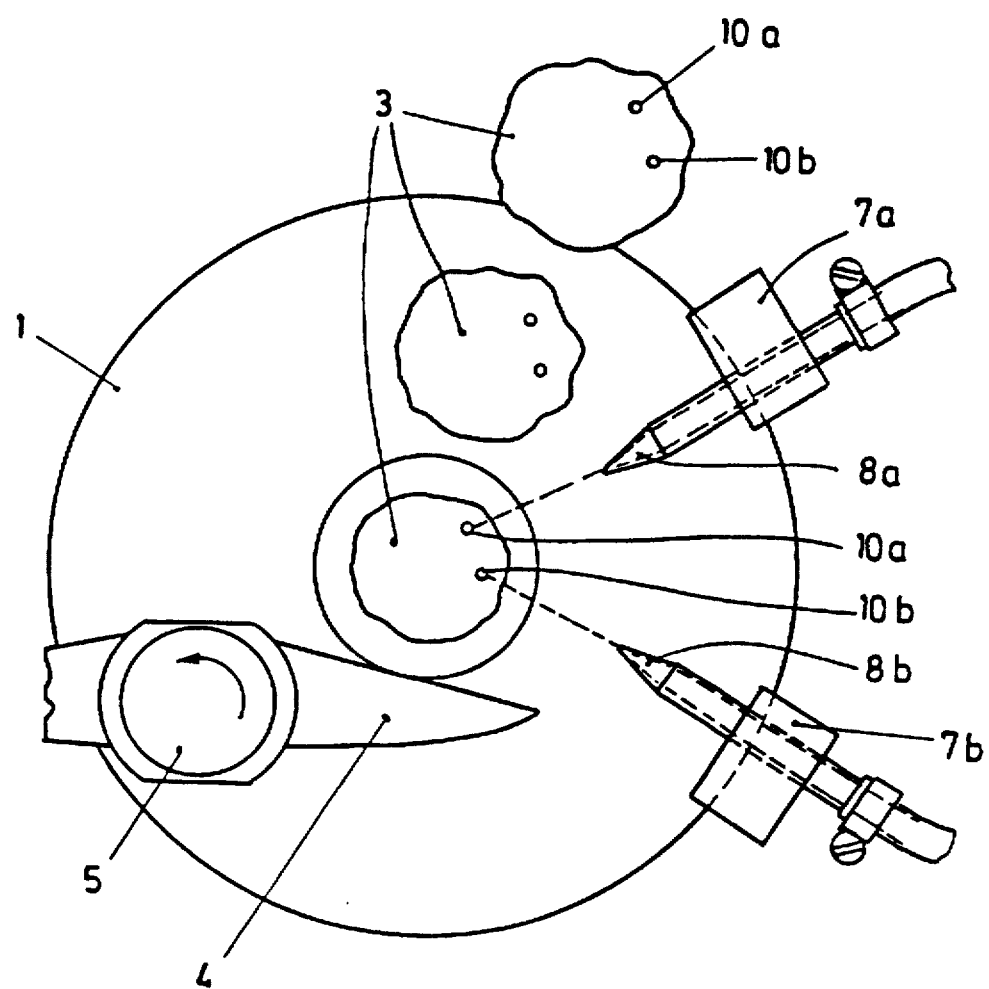
FIG. 2 shows the device according to the application from the front.

In the exemplary embodiment illustrated, as can be seen from FIG. 2, two spray devices 7a, 7b are provided on the circumference of the die head 1 which each spray a spot 10a, 10b onto the part 3 before the cutting-off. The trajectory of the cut-off parts 3 can also be readily seen in FIG. 2, which trajectory is a function of the shape of the knife 4, its direction of rotation and rate of rotation and of the extrusion rate and of the pressure of the extruded material. The spray devices 7 are aligned and controlled such that they only spray the parts 3 before the cutting-off, to avoid contamination of the knife 4 and of the parts 3 being thrown off.

The device and process according to the invention thus find a particular application in the ink-spraying of at least one spot, in particular an eye, for example animal eyes, on snacks which are in the state of expansion on leaving the extruder die and before they are cut off. The frequency during ink-spraying is adapted to the frequency of the cutting knife.

I claim:

1. In a process for extruding a material at a predetermined rate of extrusion, spraying-on said material, and cutting-off said material at a predetermined rate of cutting, in which said extruding of said material is by means of an extruder device and cutting-off said material is by means of a cutting device, said cutting-off of said material being performed after said material leaves an extrusion die, thereby producing an extruded material, the improvement comprising:

intermittently spraying-on said extruded material at least one additive after said extruded material leaves said extrusion die but before said cutting-off of said extruded material; and interrupting said spraying-on during said cutting-off of said extruded material.

2. The process according to claim 1, wherein said interrupting occurs at a frequency of between about 500 hertz to about 20000 hertz.

3. The process according to claim 1, further comprising synchronizing said spraying-on of each said at least one additive with said predetermined rate of extrusion.

4. The process according to claim 1, further comprising synchronizing said spraying-on of each said at least one additive with said predetermined rate of cutting-off of said cutting device.

5. The process according to claim 1, wherein at least one of each said at least one additive is a preselected ink.

6. The process according to claim 5, further comprising simultaneous spraying-on to said extruded material of each said preselected ink.

7. The process according to claim 5, further comprising sequentially spraying-on to said extruded material of each said preselected ink.

8. The process according to claim 1, wherein at least one of each said at least one additive is an aromatic substance.

9. The process according to claim 1, further comprising adjusting direction of each said at least one additive being sprayed-on said extruded material.

10. In a device for extruding a material, spraying-on said material and cutting-off said material, said device having an extruder screw for feeding said material to be extruded at a predetermined rate of extrusion, an extrusion die through which said material is extruded producing thereby extruded material, means for cutting-off, at a predetermined rate of cutting-off, said extruded material after said extruded material emerges from said extrusion die, the improvement comprising: at least one means for intermittently spraying-on at least one additive onto said extruded material before said extruded material is cut off, said means for spraying-on being disposed proximate said extrusion die, wherein each said at least one means for spraying-on has at least one nozzle from which said at least one additive emerges, and wherein said means for spraying-on further comprises means for interrupting each said at least one means for spraying-on during said cutting-off of said extruded material.

11. The device according to claim 10, further comprising means for adjusting each said at least one means for spraying-on such that a jet of each said at least one additive only reaches said extruded material.

12. The device according to claim 10, further comprising means for interrupting said spraying-on during said cutting-off of said extruded material wherein said spraying-on of each said at least one additive is made to be intermittent and wherein said means for interrupting causes interruption at a frequency of between about 500 hertz to about 20000 hertz.

13. The device according to claim 10, further comprising means for synchronizing said spraying-on of each said at least one additive with said predetermined rate of extrusion.

14. The device according to claim 10, further comprising means for synchronizing said spraying-on of each said at least one additive with said predetermined rate of cutting-off of said cutting device.

15. The device according to claim 10, wherein said means for cutting-off, at a predetermined rate of cutting-off, said extruded material after said extruded material emerges from said extrusion die, has at least one knife mounted on a die head, of said extrusion die and each said at least one knife being mounted in a manner creating minimal clearance between said extrusion die and each said at least one knife.

16. The device according to claim 10, wherein each said at least one means for spraying-on has at least one print head, each said at least one print head selected from the group of print head types consisting of ink-jet, magnetic, airless, bubble-jet and piezoelectric and further comprising means for adjusting direction of a jet of each said at least one additive from each said at least one print head.

* * * * *